Jan. 24, 1928.

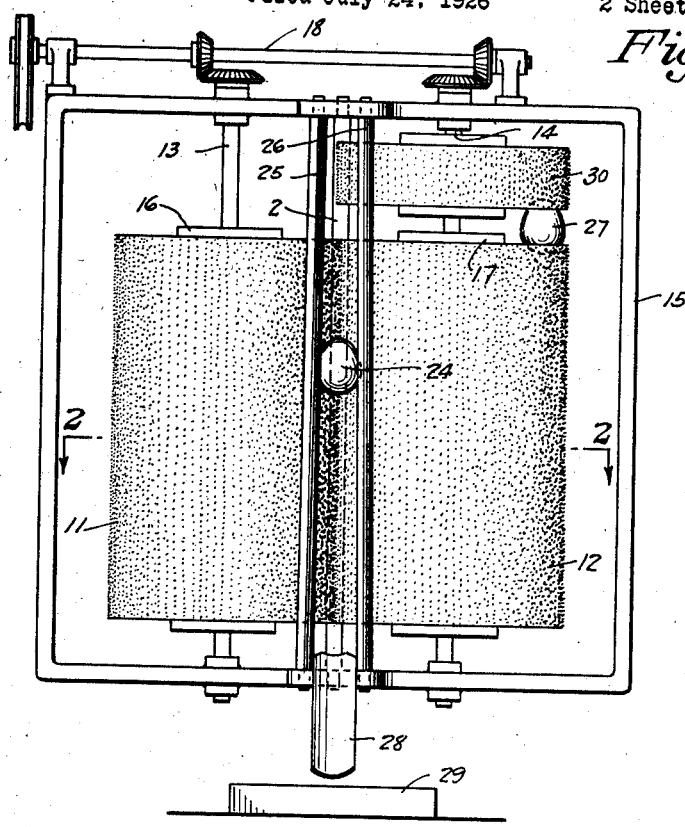
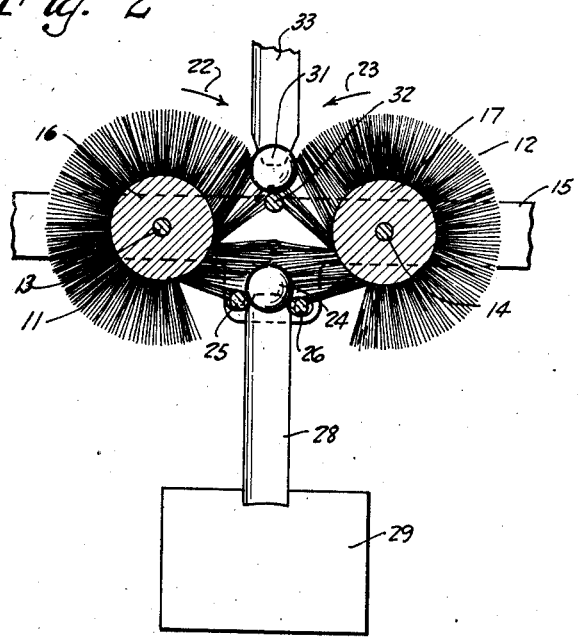

M. KASSER 1,657,126

EGG CLEANING MACHINE

Filed July 24, 1926  2 Sheets-Sheet 2

Inventor
Morris Kasser
by John F Lam
Attorney

Patented Jan. 24, 1928.

1,657,126

UNITED STATES PATENT OFFICE.

MORRIS KASSER, OF SAN FRANCISCO, CALIFORNIA.

EGG-CLEANING MACHINE.

Application filed July 24, 1926. Serial No. 124,669.

This invention relates to the cleaning of eggs, and more particularly to machinery by the aid of which the eggs can be safely cleaned or washed.

It is a matter of common observation that may eggs, as taken from the nests, are soiled, and in such condition have a much reduced marketable value. Hence it happens that an economical method of cleaning such eggs is highly desirable; and it is one of the objects of my invention to provide a machine whereby such an operation can be practiced in a simple and inexpensive manner.

Various cleaning and washing machines have been proposed, but these usually have disadvantages; either the egg is not thoroughly cleaned, or else a large percentage of eggs passing through the machine is broken, entailing large losses. It is thus another object of my invention to provide an apparatus that is not only harmless as regards injury to the eggs, but also provides a thorough cleaning therefor.

In my invention, use is made of a scouring device that is mechanically moved to act on the egg surface. Such a device may be a brush constructed from appropriate material, such as vegetable or animal fibers. In this arrangement, it is another object of my invention to make it possible to pass the eggs through the machine and past the scouring device simply by the aid of gravity and without the necessity of providing a conveyor for this purpose.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is an elevation, mainly diagrammatic, of one form of egg cleaner embodying my invention;

Fig. 2 is a sectional view, taken along plane 2—2 of Fig. 1;

Figure 3:
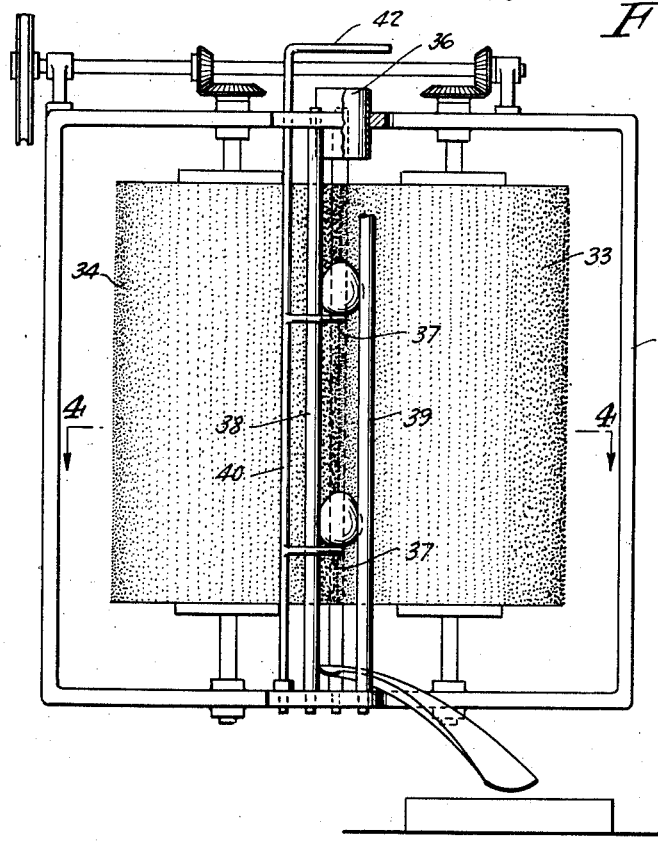
Fig. 3 is an elevation, mainly diagrammatic, of a modification.

In order to clean an egg, first the egg is treated with a substance that loosens the dirt or dissolves it, such as a lime solvent. This treatment may be accomplished by dipping or spraying the egg. The removal of the dirt can be accomplished by vigorously rubbing the shell while it still carries the substance; and this rubbing can be prolonged sufficiently to dry the egg thoroughly. The rubbing and subsequent drying is accomplished by the aid of my invention in a neat and expeditious manner. For this purpose, I show in Figs. 1 and 2, a scheme incorporating one or more round brushes 11 and 12, serving as the rubbing or scouring medium, and which are mounted for rotation on an axis that departs considerably from the horizontal. In the present instance, the brushes 11 and 12 are mounted on vertical shafts 13 and 14 journaled in a frame 15, which is shown merely diagrammatically. This frame serves substantially as the entire support for the mechanism. The brushes 11 and 12 have preferably long, pliable bristles, such for example as vegetable fibres; but of course varying forms and materials of bristles can be used. The bristles can be secured on cores 16 and 17, fastened to the shafts 13 and 14.

The drive for the brushes can be accomplished by the aid of the gearing 18, connected to any convenient source of motion, as for example, an electric motor. The gearing 18 connects both shafts so that brushes 11 and 12 rotate in opposite directions, as indicated by arrows 22 and 23. The brushes 11 and 12 can be rotated at any convenient speed; a wide range is permissible, as for example from one or two hundred revolutions per minute to several thousand. The arrangement is such that an egg 24 can be passed by gravity along the length of the brushes and adjacent their meeting point. It is evident that for the position shown, the egg 24 would be thrust outwardly from the brushes due to their directions of rotation; and in order to hold the egg 24 against outward movement and to serve as a guide, a pair of spaced rods 25 and 26 is provided, substantially paralleling the line of movement of the egg 24. The rods are spaced apart just sufficiently to prevent the passage of the egg 24 between them and are preferably spread slightly toward the discharge end, so as to facilitate the action of gravity to bring the egg down, by leaving an increasingly large space for the egg to drop through.

It is also to be noticed that the rods 25 and 26 are close enough to the brushes 11 and 12 that the egg 24 is in the path of the bristles. If no further precautions were taken, it is obvious that the egg 24 would simply slide by gravity along rods 25 and 26, and a portion only of its surface would be scoured or rubbed. In order to turn the egg 24 as it travels downwardly, I provide an arrangement whereby one of the brushes acts as a source of motion. For this purpose, the egg 24 is arranged to be influenced by the bristles of brush 12 more than by those of brush 11, as for example, by guiding the egg 24 nearer the axis of brush 12. This can be done by an unsymmetrical arrangement of rods 25 and 26, the rod 25 being closer to the brushes and to their meeting line than rod 26. But obviously, other forms of guides that serve to hold egg 24 nearer to the bristles of one brush would accomplish this purpose.

It is evident that, as viewed in Fig. 2, egg 24 will be rotated by friction of the bristles of brush 12 in a clockwise direction. Thus the egg surface is evenly cleaned. The guides 25 and 26 can be arranged to be freely rotatable about their axes so as to provide a rolling contact between them and the egg; or else they can be made from polished material, such as glass, which introduces little friction against the rotation of the egg, and has the further advantage of not marking the egg.

It has been found that an egg deposited at the top of the brushes between them and the guides 25 and 26, takes a short time to travel by gravity to the bottom, the bristles having a restraining action. When the egg reaches the bottom, it falls on a slanting chute 28, leading to a resilient delivery pad 29. The eggs, after treatment with the cleansing medium, can be passed in rapid succession to the machine by hand, and the same operator can remove them from pad 29. The rubbing action of the brushes not only assists the medium to cleanse the egg, but also, in the latter part of the travel of the egg, to wipe it dry. The resilience of the bristles of course prevents injury to the eggs. Since the brushes 11 and 12 are rotating usually at a relatively high speed, the moisture thus collected on the bristles is thrown off by centrifugal force, and the bristles are thus maintained indefinitely in proper working condition. The axial length of the brushes, as well as the speed of rotation, is chosen such that this drying action can take place even when feeding eggs to the machine at a rapid rate.

It may sometimes happen that with the arrangement as thus far described, the tips of the eggs may not be so thoroughly brushed as the other surfaces. To clean the tips, therefore, I arrange a supplementary brush 30, spaced from one of the others, as 12, and mounted on the same shaft. An egg 27 can be passed in an upright position, by hand between the brushes 12 and 30 before being deposited between the brushes 11 and 12.

It is also possible, in this arrangement, to utilize the other side of the brushes 11 and 12 for cleaning another egg 31. In this case, since the brushes turn inwardly, the egg 31 would be carried between the two brushes, but this is prevented by a stationary rod 32. A chute 33 similar to chute 28 is also provided for this side of the apparatus. Thus two operators can utilize the same apparatus simultaneously.

Figure 4:
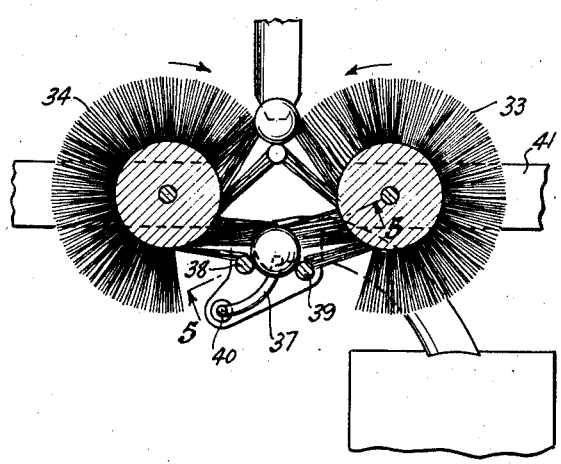
Fig. 4 is a sectional view, taken along plane 4—4 of Fig. 3.
Figure 5:
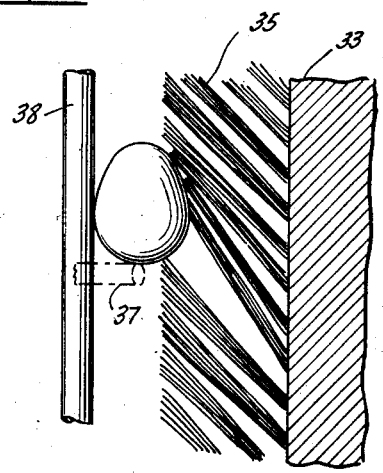
Fig. 5 is a fragmentary view, partly in vertical section, of the apparatus shown in Fig. 3.

In the modification of Figs. 3, 4, and 5, the arrangement of brushes 33 and 34 and their drive are substantially similar to that shown in Figs. 1 and 2. However, I obviate in this form, the necessity of a separate tip cleaning brush, such as 30 of Fig. 1. This is accomplished by the provision of upward slanting bristles 35 (Fig. 5) for both brushes, whereby these bristles reach the tips of the eggs. Furthermore, a loading chute 36 is indicated through which the eggs can be dropped by hand.

In this modification, provision is also made to retain the eggs for a short time in the brushes. For this purpose, one or more projections 37 are provided, arranged to form a temporary seat for the eggs as they travel through the machine. These projections enter between the guide rods 38 and 39, as clearly shown in Fig. 4, but may be removed therefrom, as by rotating a support 40 to which the projections are fastened. This supporting bar 40 is journaled conveniently in the supporting frame 41, through which at the upper end the bar 40 extends. A handle 42 for manual manipulation of the seating projections 37 is formed on the bar 40.

This handle is arranged to extend over the opening of chute 36. Every time an egg is to be dropped through the chute, the handle 42 must be turned out of way, and after the egg is dropped, the handle is returned to the position shown. This turning serves to release whatever eggs may be on projections 37; that egg which is on the lower projection passes out of the machine, while the upper egg gradually comes to rest on the lower projection 37. In the meanwhile, the newly deposited egg travels to the upper rest or projection 37. Both eggs stay stationary until still another egg is deposited as before. In this manner, a period of dwell is secured that ensures a sufficiently long interval of rubbing or scouring of the eggs.

It is evident that I have provided a simple and efficient egg cleaning device, that can readily take varying sizes of eggs without danger of injury to any.

I claim:

1. In a machine for treating eggs, a rotatable scouring and drying device, and a guide substantially paralleling the axis of rotation for permitting an egg to traverse the device by gravity.

2. In a machine for treating eggs, a rotatable brushing device having an axis departing considerably from the horizontal, and a guide substantially paralleling the axis of rotation for guiding eggs travelling past the device by gravity.

3. In a machine for treating eggs, a rotatable brushing device having a vertical axis, and means for holding an egg so that it will descend along the brush by gravity in a path parallel with said axis and so that it will be rolled by the brush.

4. In a machine for treating eggs, a rotatable brushing device having an axis departing considerably from the horizontal, and means arranged to hold an egg adjacent the device but to permit it to descend by gravity in a path parallel with said axis, said means permitting rolling of the egg thereon.

5. In a machine for treating eggs, a rotatable brushing device having an axis departing considerably from the horizontal, and a pair of round rods substantially parallel to the brushing surface and forming a guide for an egg during its gravital descent along the brushing device, said rods permitting rolling of the egg thereon.

6. In a machine for treating eggs, a rotatable brushing device, and a pair of round rods substantially parallel to the brushing surface, and forming a guide for an egg, said rods being so spaced from the device that an egg confined thereby is given a rolling motion by the device.

7. In a machine for treating eggs, a pair of rotatable brushing devices having adjacent brushing surfaces, means for rotating them in opposite directions, and a pair of revolvable rods for confining an egg between the devices, said rods permitting rolling of the egg thereon.

8. In a machine for treating eggs, a pair of rotatable brushing devices having adjacent brushing surfaces that depart considerably from the horizontal, means for rotating them in opposite direction, and a pair of rods for confining an egg between the devices, said rods being so arranged that, one brush acts more strongly than the other, to cause the egg to roll on the rods.

9. In a machine for treating eggs, a pair of rotatable brushes having adjacent brushing surfaces, means for rotating the brushes in opposite directions so that at that locality where the brushes are closest together, they serve to move an egg away, and a pair of rods forming a guide to confine the egg against such movement.

10. In a machine for treating eggs, a pair of rotatable brushes having adjacent brushing surfaces, means for rotating the brushes in opposite directions so that at that locality where the brushes are closest together, they serve to move an egg away, and a pair of rods forming a guide to confine the egg against such movement, the spacing of the rods being such that one of the brushes serves to roll the egg on the guides.

11. In a machine for treating eggs, a pair of rotatable brushes having adjacent brushing surfaces, these surfaces departing considerably from a horizontal direction, means for rotating the brushes in opposite directions so that at that locality where the brushes are closest together, they serve to move an egg away, and a pair of rods forming a guide to confine the egg against such movement.

12. In a machine for treating eggs, a pair of rotatable brushes having adjacent brushing surfaces, these surfaces departing considerably from a horizontal direction, means for rotating the brushes in opposite directions so that at that locality where the brushes are closest together, they serve to move an egg away, and a pair of rods forming a guide to confine the egg against such movement, the spacing of the rods being such that one of the brushes serves to roll the egg on the guides.

13. In a machine for treating eggs, a rotatable brush having non-radial bristles, and a guide for guiding an egg past the bristles in a direction substantially parallel to the exterior brush surface.

14. The machine as claimed in claim 13, with the limitation that the brush axis departs considerably from the horizontal, whereby the egg can progress past the bristles by gravity, and that the bristles are slanted upwardly on the brush.

15. In a machine for treating eggs, a pair of contacting rotatable brushing devices, and a guide placed between the devices where they contact, to prevent an egg acted upon, from being fed between the devices.

16. In a machine for treating eggs, a pair of contacting rotatable brushes, the contacting locality being substantially vertical, means for rotating the brushes in opposite directions whereby at one side, the brushes tend to move an egg inwardly between them, and a rod forming a guide between the brushes for preventing the egg from entering between the brushes.

17. In a machine for treating eggs, a rotatable brushing device having a substantially vertical axis, a guide for permitting an egg to pass by gravity adjacent said device, and means for temporarily hindering the progress of the egg on the guide.

18. In a machine for treating eggs, a rotatable brushing device having a substantially vertical axis, a guide for guiding the gravital descent of an egg past the device, and a movable stop for the egg arranged to hinder its descent temporarily.

19. In a machine for treating eggs, a pair of rotatable brushes having adjacent round surfaces substantially vertical, a guide for confining an egg between said round surfaces, and to guide the descent of the egg between the round surfaces, a chute for depositing the egg between the guide and the brushes, one or more vertically spaced rests for the egg as it descends, a movable support for the rests, and means carried by the support for preventing the insertion of an egg in the chute while the rests are in active position.

In testimony whereof I have hereunto set my hand.

MORRIS KASSER.